US009754620B2

(12) United States Patent
Kumar et al.

(10) Patent No.: US 9,754,620 B2
(45) Date of Patent: Sep. 5, 2017

(54) BIMODAL MODULATION

(71) Applicant: SEAGATE TECHNOLOGY LLC, Cupertino, CA (US)

(72) Inventors: Vijay Kumar, Edina, MN (US); Narayanan Ramakrishnan, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/012,571

(22) Filed: Feb. 1, 2016

(65) Prior Publication Data
US 2016/0217821 A1   Jul. 28, 2016

Related U.S. Application Data

(63) Continuation of application No. 14/607,671, filed on Jan. 28, 2015, now Pat. No. 9,251,824.

(51) Int. Cl.
| G11B 21/02 | (2006.01) |
| G11B 20/10 | (2006.01) |
| G11B 5/55 | (2006.01) |
| G11B 5/48 | (2006.01) |

(52) U.S. Cl.
CPC ........ *G11B 20/10268* (2013.01); *G11B 5/483* (2015.09); *G11B 5/4826* (2013.01); *G11B 5/5552* (2013.01); *G11B 5/5573* (2013.01)

(58) Field of Classification Search
None
See application file for complete search history.

(56) References Cited

U.S. PATENT DOCUMENTS

| 5,523,898 | A | 6/1996 | Jove et al. |
| 5,633,568 | A | 5/1997 | Dunfield |
| 5,706,267 | A | 1/1998 | Kimura et al. |
| 6,043,943 | A | 3/2000 | Rezzi et al. |
| 6,307,699 | B1 | 10/2001 | Patti et al. |
| 8,393,074 | B1 | 3/2013 | Takayama et al. |
| 9,251,824 | B1* | 2/2016 | Kumar ............... G11B 5/5552 |
| 2004/0075940 | A1 | 4/2004 | Bajorek et al. |
| 2005/0036229 | A1 | 2/2005 | Taniguchi et al. |
| 2005/0185344 | A1 | 8/2005 | Ito et al. |
| 2005/0201017 | A1 | 9/2005 | Koga et al. |
| 2007/0165324 | A1* | 7/2007 | Kwon ............... G11B 5/6058 360/75 |

(Continued)

OTHER PUBLICATIONS

Adams, J.D., et al., Nanowatt chemical vapor detection with a self-sensing, piezoelectric microcantilever array, Applied Physics Letters, Oct. 20, 2003, pp. 3428-2430, vol. 83, No. 16, US.

(Continued)

*Primary Examiner* — Peter Vincent Agustin
(74) *Attorney, Agent, or Firm* — Hall Estill Attorneys at Law

(57) ABSTRACT

An apparatus and associated method contemplating a head gimbal assembly (HGA) and a bridge circuit including first and second microactuators attached to the HGA. Computation logic is connected to the bridge circuit and configured to independently measure an electrical output of each microactuator and to sum the electrical outputs to derive a value related to a vertically dominant modulation mode of the HGA.

19 Claims, 9 Drawing Sheets

(56) References Cited

U.S. PATENT DOCUMENTS

| | | | |
|---|---|---|---|
| 2007/0258169 A1* | 11/2007 | Lee | G11B 5/3133 360/234.1 |
| 2008/0002305 A1* | 1/2008 | Kwon | G11B 5/4826 360/294.4 |
| 2009/0161264 A1 | 6/2009 | Meyersweissflog | |
| 2010/0053789 A1 | 3/2010 | Duric et al. | |
| 2010/0232069 A1* | 9/2010 | Hata | G11B 5/4826 360/245.4 |
| 2010/0309578 A1* | 12/2010 | Lee | G11B 5/40 360/75 |
| 2013/0152695 A1 | 6/2013 | Ramakrishnan et al. | |
| 2016/0217821 A1* | 7/2016 | Kumar | G11B 5/4826 |

OTHER PUBLICATIONS

Dosch, Jeffrey J., et al., A Self-Sensing Piezoelectric Actuator for Collocated Control, J. of Intell. Mater. Syst. and Struct., pp. 166-185, vol. 3, Jan. 1992, Technomic Publishing Co., Inc., US.

Pang, Chee Khiang, et al., Self-Sensing Actuation for Nanopositioning and Active-Mode Damping in Dual-Stage HDDs, IEEE/ASME Transactions on Mechatronics, pp. 328-338, vol. 11, No. 3, Jun. 2006, US.

Wang, Xiaoyun, et al., Enhanced Mechanical Resonant Modes Detection Using Indirect Driven Self-Sensing Actuation, Department of Electrical and Computer Engineering, National University of Singapore, pp. 84-87.

* cited by examiner

BIMODAL MODULATION

RELATED APPLICATION

The present application is a continuation of U.S. patent application Ser. No. 14/607,671 which issued as U.S. Pat. No. 9,251,824 on Feb. 2, 2016.

SUMMARY

Various embodiments of the present technology are generally directed to the construction and use of microactuator circuitry to detect motion of an object.

Some embodiments of this disclosure contemplate a head gimbal assembly (HGA) and a bridge circuit including first and second microactuators attached to the HGA. Computation logic is connected to the bridge circuit and configured to independently measure an electrical output of each microactuator and to sum the electrical outputs to derive a value related to a vertically dominant modulation mode of the HGA.

DETAILED DESCRIPTION

A wide variety of machines employ microactuators for precise control of moving parts. A "microactuator" for purposes of this description includes a device that mechanically deforms when subjected to an external excitation, such as a driving voltage, and that develops a sense voltage in proportion to deformation. Because of this dual functionality these devices are commonly referred to as a self-sensing actuator. For purposes of this illustrative description the microactuator can include a piezoelectric transducer (PZT), although the contemplated embodiments are not so limited. In alternative embodiments the microactuator can otherwise be constructed to include things such as a magnetorestrictive element or a piezomagnetic element and the like.

Figure 1:
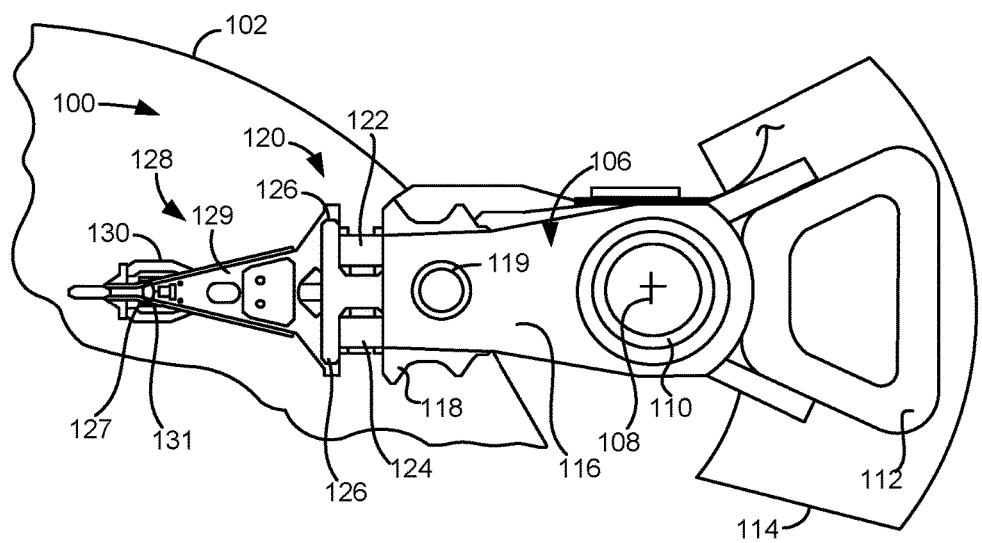
FIG. 1 depicts a top view of an actuator in a disc drive data storage device.

For example, FIG. 1 depicts part of a disc drive data storage device that employs a microactuator for movement control. The disc drive has a rotatable actuator 100 that is precisely moved to position a read/write head at its distal end in alignment with a data storage track formed in the surface of a rotating magnetic recording medium 102. The read/write head, which can be a perpendicular magnetic head or a lateral magnetic head, reads and writes information by detecting and modifying the magnetic polarization of the recording layer on the surface of the storage disc 102. The actuator 100 has a central body 106 that is journalled for rotation around an axis of rotation 108 of a bearing 110. A voice coil 112 extends from the body 106 where it is immersed in a magnetic field from opposing magnets (only the bottom magnet 114 is depicted in FIG. 1 for clarity sake). An arm 116 extends from the body 106 opposite the voice coil 112. A plate 118 is attached to the distal end of the arm 116, such as by the crimp 119 depicted in FIG. 1.

Dual stage motion control is provided in that the voice coil 112 provides coarse position control and a microactuator 120 provides fine position control of the read/write head. The microactuator 120 includes a pair of PZT elements 122, 124 that selectively move a head gimbal assembly (HGA) 128 relative to the body 106. The HGA 128 includes the plate 118, a bulkhead 126 against which the PZTs 122, 124 engage, a load beam 129, and a gimbal 130 extending from the load beam 129 that, in turn, supports the read/write head.

The read/write head has a slider that is aerodynamically designed to be supported upon an air bearing created by rotation of the storage disc 102. The surface of the slider closest to the storage disc 102 is referred to as an air bearing surface (ABS). The HGA 128 is designed to properly maintain the ABS at a desired fly height and orientation apart from the surface of the storage disc 102. A heater 127 is provided in the read/write head to control the fly height by pole tip protrusion. The HGA 128 also includes a flexible circuit (trace) 131 that transmits electrical signals and power to the read/write head and other electronics such as the heater 127.

Figure 2:
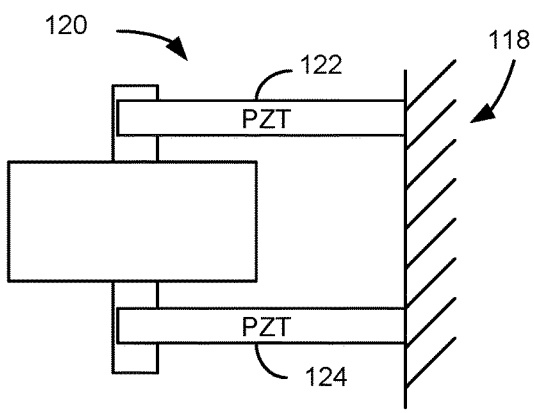
FIG. 2 diagrammatically depicts a top view of the microactuator in the neutral position in the disc drive in FIG. 1.
Figure 3:
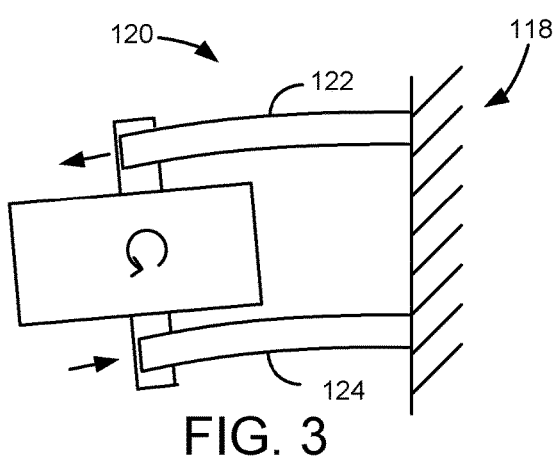
FIG. 3 is similar to FIG. 2 but depicting the microactuator having rotated the head gimbal assembly (HGA).

FIG. 2 diagrammatically depicts the PZT elements 122, 124 at a neutral position corresponding to a non-driven excitation state. Controlled application of a driving voltage to the PZT elements 122, 124 deforms them to rotate the HGA 128 relative to the body 106 as depicted in FIG. 3. This arrangement can be constructed by poling the PZTs across the thickness (normally done in practice) and flipping the polarities between the two PZTs in FIG. 2. By the piezoelectric effect, applying a driving voltage that is opposite to the poled polarity of the PZT 124 causes it to shorten, whereas applying the driving voltage that is the same as the poled polarity of the PZT 122 causes it to lengthen. Shortening the PZT 124 and lengthening the PZT 122 causes the counter-clockwise rotational displacement depicted in FIG. 3. Reversing the polarity of the driving voltage imparts a clockwise rotational displacement in similar fashion.

Driving the PZTs 122, 124 to achieve this rotational movement provides fine positioning control of the read/write head relative to the data storage tracks; the primary purpose of the microactuator 120 in the disc drive. The skilled artisan readily understands that the fine positioning can be achieved in alternative ways, regardless of the poled polarities of the PZTs 122, 124, such as by providing individual voltages to them and perhaps phase shifting one or both of the individual driving voltages.

The storage disc 102 operably rotates at high speeds, subjecting the HGA 128 to forces and exciting resonance that can significantly alter the position of the ABS. For example, these forces can distort the HGA 128 enough to create a pitch static angle that alters the flying orientation of the read/write head. Modulation-related failures are typically caused by excitation of HGA resonances. These forces and resonances can make the HGA 128 unstable for its intended purpose when it becomes unacceptably sensitive to disturbances (can be particle or contaminant interactions, for example) at the head-disc interface. Such sensitivities can cause modulation-related failures rendering the disc drive unreliable and short lived.

HGA resonance stems from a wide range of excitation mechanisms and failure modes. The complex structure of the HGA results in a large number of structural modes, making it difficult to entirely design them out of the disc drive. Further, the modal response of the HGA can vary significantly from part to part. For this reason modulation failures may be experienced only on a portion of a drive population. This makes individual characterization of the modal response of each individual HGA important. Therefore, what is needed is an in situ test that compares the HGA modulation to an expected threshold to identify characteristic HGA modulation issues during the manufacturing process and thereafter. It is to those improvements and others that the embodiments of the present technology are directed.

Figure 4:
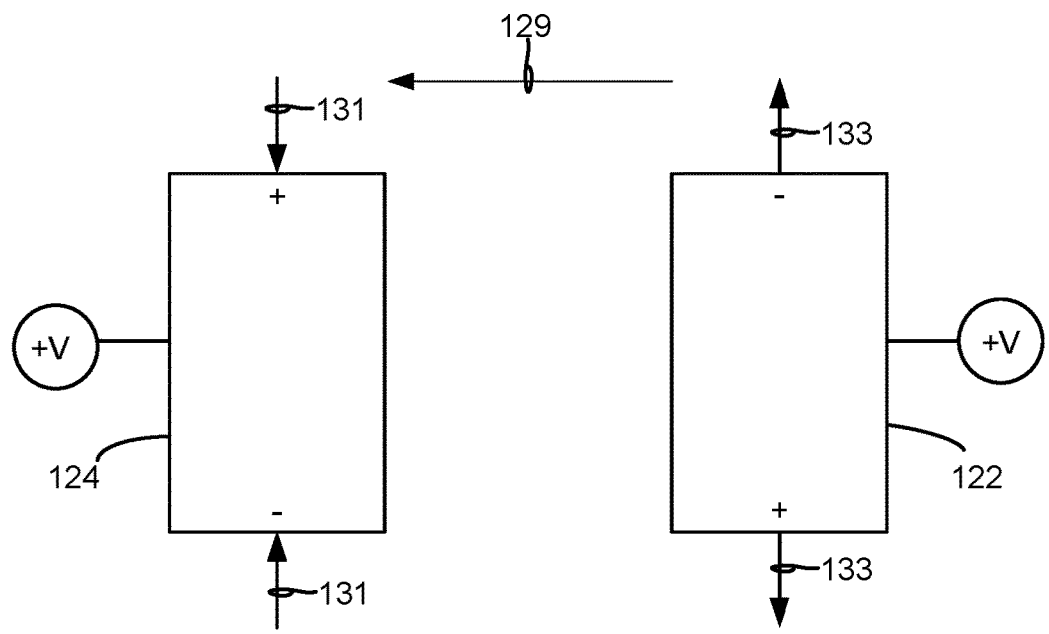
FIG. 4 diagrammatically depicts the piezoelectric effect in the PZT elements in the microactuator in FIG. 3.

Referencing back to FIG. 3 momentarily, recall that the counterclockwise HGA 128 rotation requires a shortening (compression) of the PZT 124 and a lengthening (tension force) on the PZT 122. External forces acting on the HGA 128 in the offtrack dominant mode create the same result; they compress the PZT 124 and lengthen the PZT 122. FIG. 4 diagrammatically depicts the PZTs 122, 124 with their polarities swapped in relation to the longitudinal poling axis 129. The arrows 131 facing each other represent the compressive force acting on the PZT 124 and the arrows 133 facing away from each other represent the tensile force acting on the PZT 122. By the piezoelectric effect, the compressive force 131 acting upon the positively poled PZT 124 produces a positive sense voltage. The tensile force 133 acting upon the negatively poled PZT 122 likewise produces a positive sense voltage. For purposes of this description and meaning of the appended claims, when the two PZTs 122, 124 strain in the same direction at the same time, as indicated by the polarity of their sense voltages, then the mode is termed a symmetric mode.

Figure 7:
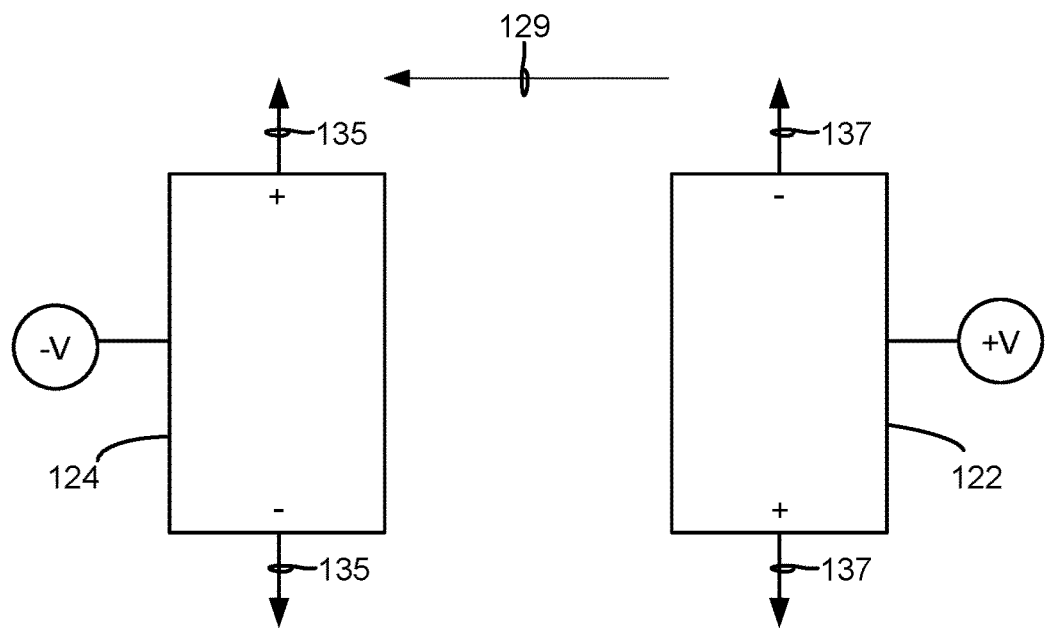
FIG. 7 diagrammatically depicts the piezoelectric effect in the PZT elements in the microactuator in FIG. 6.
Figure 5:
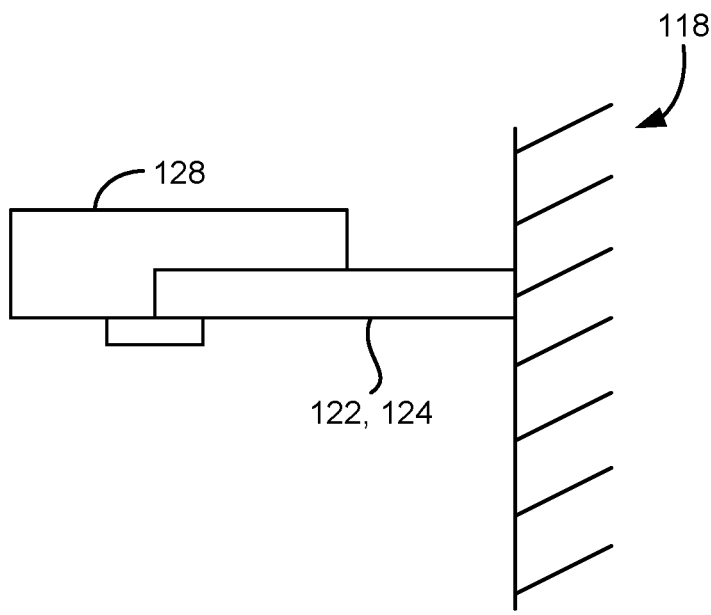
FIG. 5 is a side view of FIG. 2 in the neutral position of the microactuator.
Figure 6:
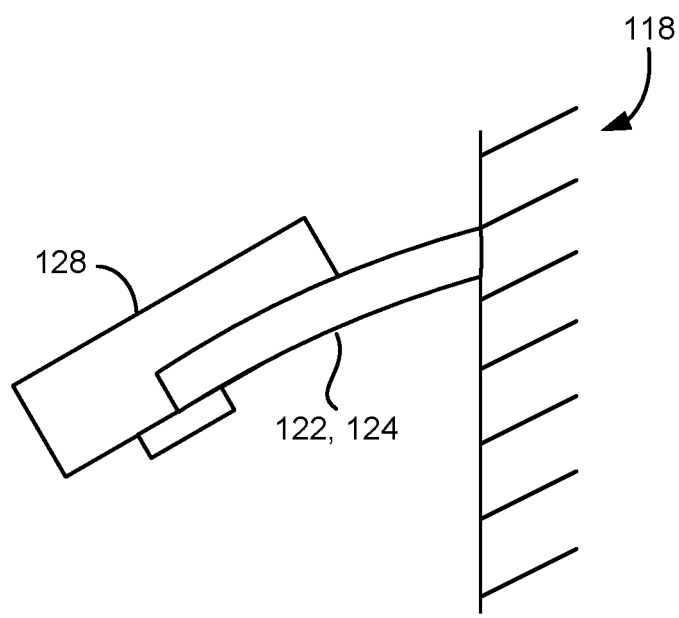
FIG. 6 is similar to FIG. 5 but depicting vertical-dominant mode deflection of the microactuator.

FIG. 5 is a side view of FIG. 2 in the vertically-neutral position, and FIG. 6 depicts external forces acting on the HGA 128 in the vertically-dominant mode. In this case both PZTs 122, 124 are lengthened as they are flexed downward. FIG. 7 is similar to FIG. 4 except that in this case both of the PZTs 122, 124 are subjected to tensile forces, represented by the opposing arrows 135, 137 facing away from each other due to the flexing. By the piezoelectric effect, the tensile force acting upon the positively poled PZT 124 produces a negative sense voltage (−V). The tensile force acting upon the negatively poled PZT 122 produces a positive sense voltage (+V). For purposes of this description and meaning of the appended claims, when the two PZTs 122, 124 strain in opposite directions at the same time, as indicated by the polarity of their sense voltages, then the mode is termed an asymmetric mode.

Figure 8:
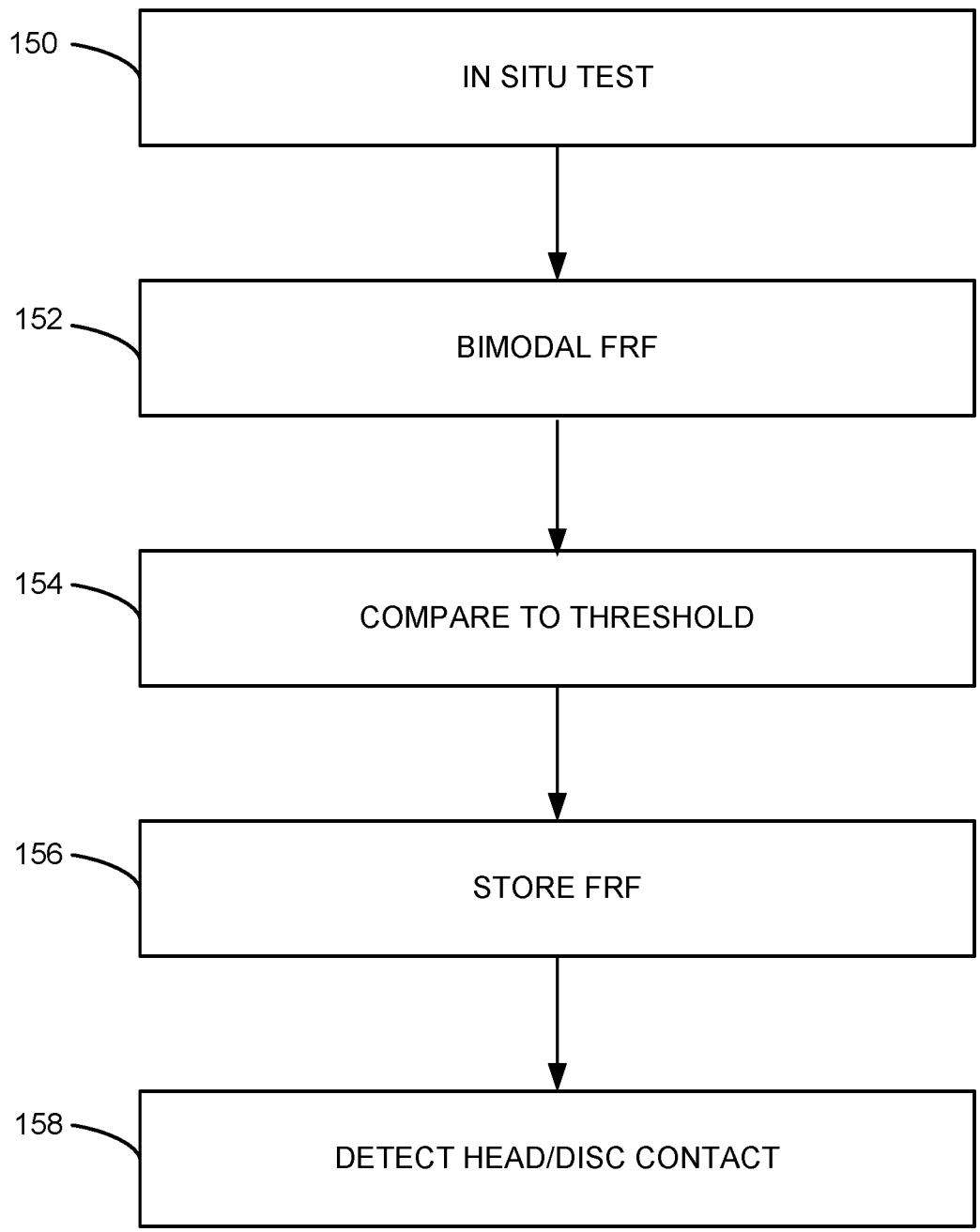
FIG. 8 is a flowchart depicting steps in a method for performing in situ testing in accordance with embodiments of this technology.

FIG. 8 is a flowchart depicting steps in a method for performing an in situ HGA modulation test on a disc drive in accordance with illustrative embodiments of the present technology. The method begins in block 150 by performing in situ testing. For purposes of this description, the meaning of an "in situ" test is limited to testing that is performed using only the hardware and logic in place within the device under test; in this example within the disc drive. The in situ test specifically does not include tests that include adding extraneous data collection devices to measure data or perform a function that the disc drive is incapable of performing with the components already in place for its intended use as a data storage device. The in situ testing in block 150 can be limited to only the HGA modulation testing of this technology or it can be included as part of other testing. For example, the in situ testing 150 can be performed as part of the drive certification stage during manufacturing of the disc drive. Subsequently, the in situ testing 150 can be performed as part of a screening test performed on disc drives that are returned from commercial use for repair or refurbishing.

Figure 9:
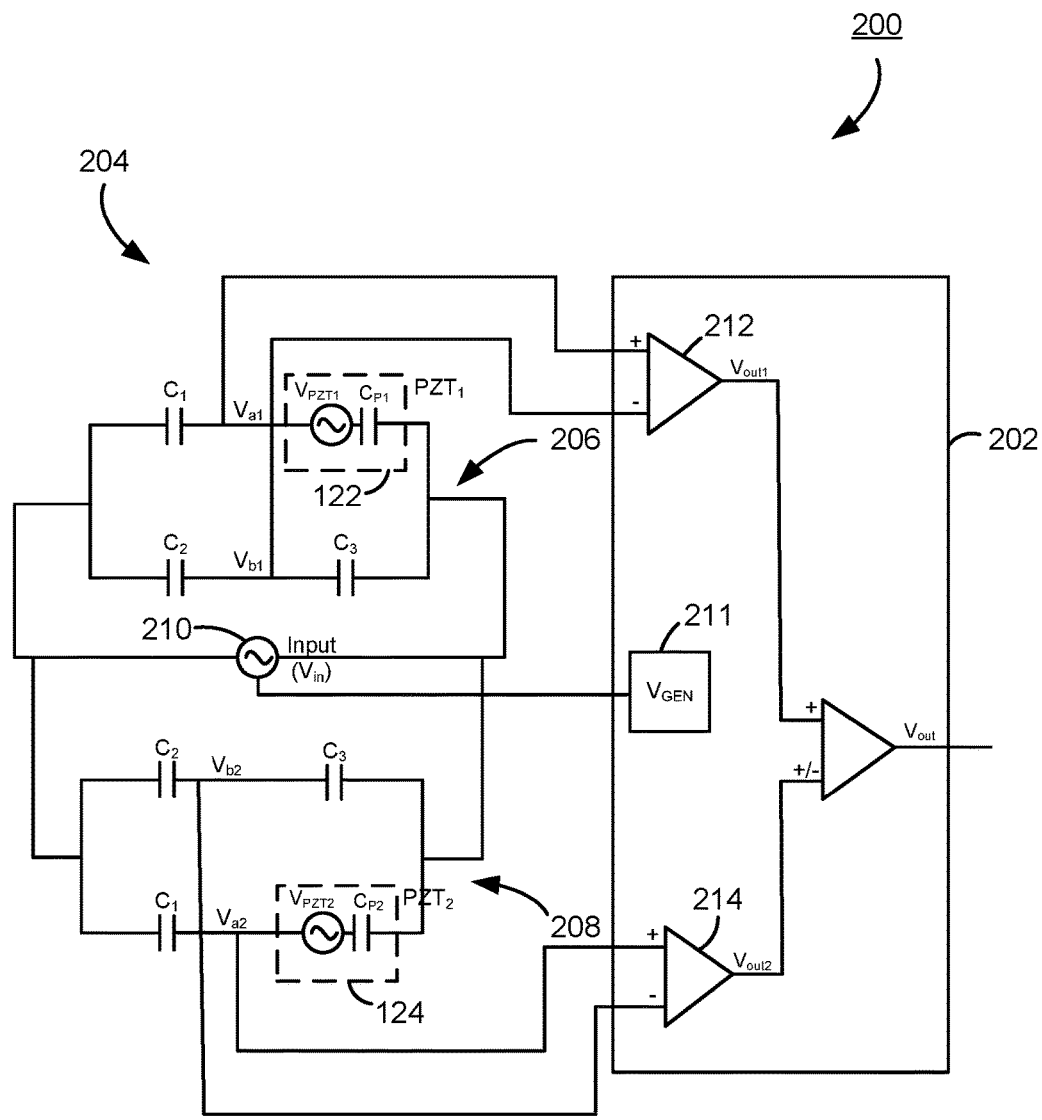
FIG. 9 is a schematic depiction of circuitry employed to obtain the bimodal characterization of the HGA modulation in accordance with illustrative embodiments of this technology.

In block 152 the disc drive's bimodal (symmetric and asymmetric modes) frequency response function (FRF) signature is obtained. FIG. 9 is a schematic depiction of microactuator circuitry 200 for obtaining the bimodal FRF in accordance with illustrative embodiments of the present technology. The microactuator circuitry 200 generally includes a computation module 202 connected to a bridge circuit 204. In these illustrative embodiments the bridge circuit 204 includes two separate Wheatstone bridge circuits 206, 208 connected in parallel to a voltage source 210. Each of the PZTs 122, 124 is schematically represented as a voltage component in series with a capacitance element. The PZT 122 is included in one branch of the Wheatstone bridge 206, and the PZT 124 is included in one branch of the Wheatstone bridge 208.

In these illustrative embodiments the PZTs 122, 124 are driven independently of each other by the excitation source, in this case the voltage source 210. Driving the PZTs 122, 124 results in unbalanced voltages $V_{out1}$, $V_{out2}$ that are each proportional to the strain in the respective individual PZT 122, 124. The computation module 202 has a summing circuit 212 that independently measures the electrical output of the PZT 122 in terms of the differential voltage $V_{a1}-V_{b1}$. For a given excitation input $V_{in}$, the voltage sensed in leg ($C_2$-$C_3$) is:

$$V_{b1} = \frac{C_3}{C_2 + C_3} V_{in}$$

Similarly, for the opposing leg ($C_1$-PZT) the sensed voltage is:

$$V_{a1} = \frac{C_p}{C_1 + C_p} V_{in} + V_{pzt1}$$

Therefore, the unbalanced voltage in the Wheatstone bridge circuit 206 is:

$$V_{a1} - V_{b1} = \left( \frac{C_p}{C_1 + C_p} - \frac{C_3}{C_2 + C_3} \right) V_{in} + V_{pzt1}$$

If C1=C2, C3≈Cp, then $V_{out1}=V_{a1}-V_{b1}=V_{pzt1}$

Similarly, the computation module 202 has another summing circuit 214 that independently measures the electrical output of the PZT 124 in terms of $V_{out2}=V_{a2}-V_{b2}=V_{pzt2}$. The asymmetric modes are calculated in terms of:

$$V_{out\text{-}asymmetric} = V_{out1} + V_{out2}$$

The symmetric modes are calculated in terms of:

$$V_{out\text{-}symmetric} = V_{out1} - V_{out2}$$

Figure 10:
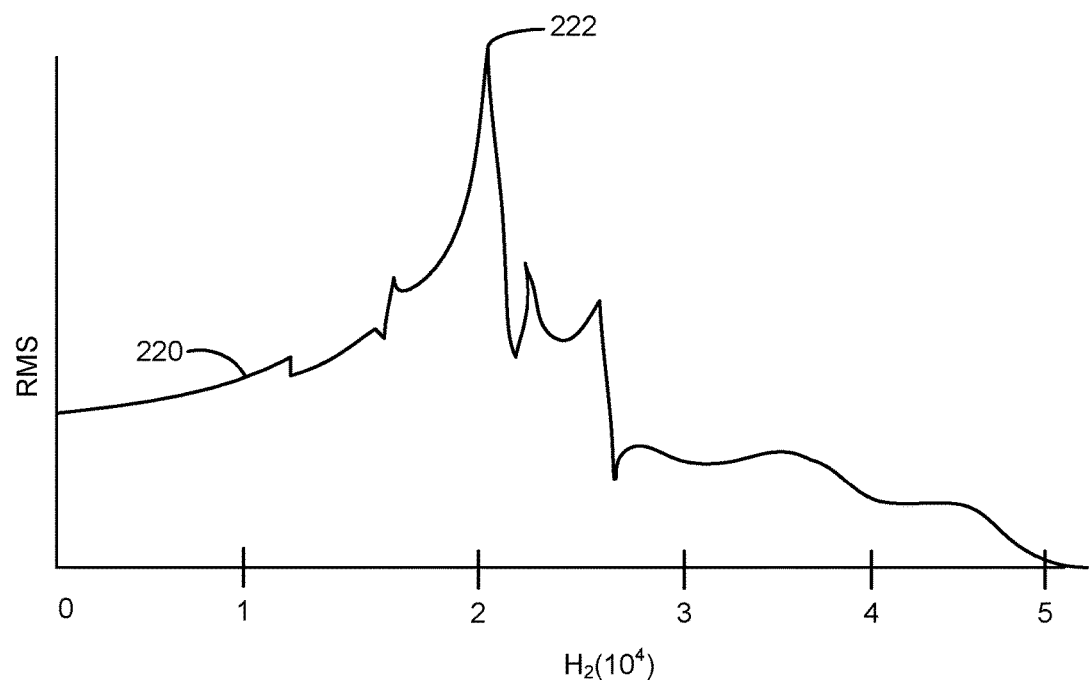
FIG. 10 is a bimodal frequency response function (FRF) signature of the disc drive in FIG. 1.

The PZTs 122, 124 are driven independently of each other by use of the separate Wheatstone bridges. In these embodiments the computation module 202 includes a voltage generator 211 capable of selectively altering electrical frequency of the driving voltage $V_{in}$. The driving voltage is varied within a predetermined frequency range, and the resultant PZT 122, 124 sense voltages are simultaneously sampled at each of these frequency points. The unbalanced voltages are recorded throughout the frequency range to characterize the HGA 128 modulation by an FRF signature. FIG. 10 graphically depicts an illustrative FRF signature 220 for the frequency range between zero to 50,000 Hz.

Figure 11:
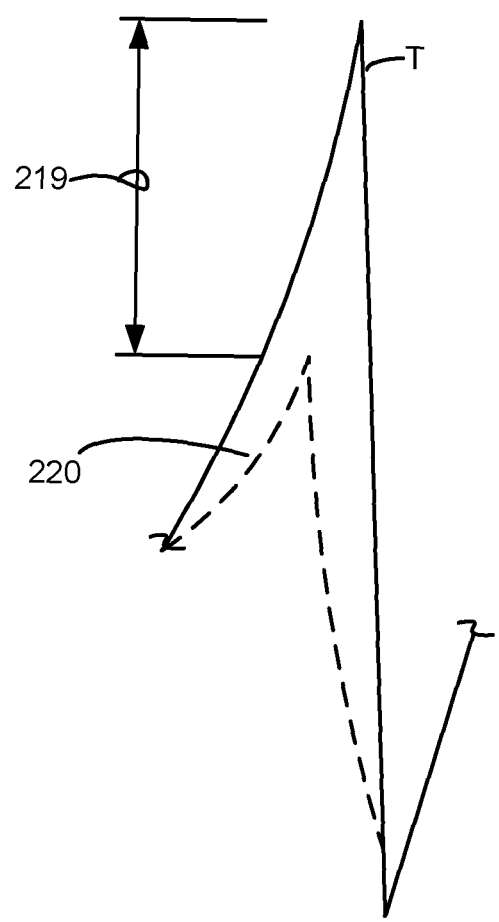
FIG. 11 is an enlarged portion of the FRF signature in FIG. 10.
Figure 12:
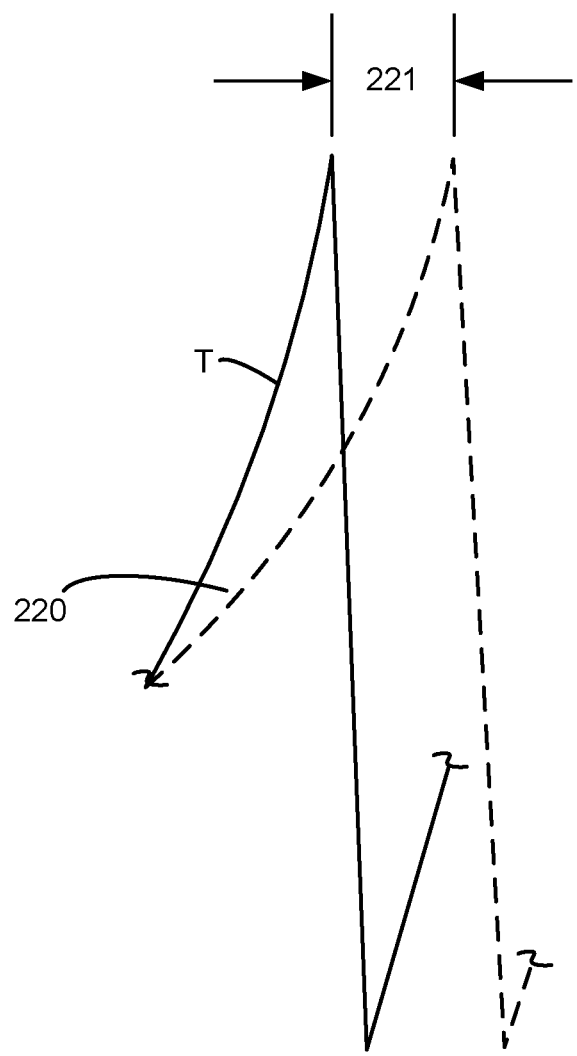
FIG. 12 is an enlarged portion of the FRF signature in FIG. 10.

Returning to FIG. 8, in block 154 the obtained FRF signature 220 can be compared to predefined thresholds to qualitatively characterize the disc drive's HGA modulation. For example, FIG. 11 depicts an enlarged portion of the FRF 220 in FIG. 10 at the 20 k Hz resonant frequency. The modal gain for the FRF 220 differs from that of a preexisting threshold FRF (or stored value, T) by a variance depicted by numeral 219. For another example, FIG. 12 is similar to FIG. 11 except depicting the resonant frequency for the FRF 220 differs from that of the threshold T by a variance depicted by numeral 221. The thresholds can be set by examining the modal response (FRF) of sample sets of HGAs and using statistics representative of this sample population. In these examples the modal gain values and/or resonant frequency values can be compared to expected threshold values, and if that comparison passes muster then the disc drive is deemed acceptable for commercial use. For example, the disc drive can be qualitatively approved if these values vary by no more than X %:

$$\frac{|Gain_T - Gain_{220}|}{Gain_{220}} * 100 < X$$

On the other hand, disc drives having statistically derived outlier values can be identified and heuristic rules employed to sort and correspondingly further test or rework the disc drive under test.

Referring to FIG. 8, in block 156 the obtained FRF signature 220 can be stored in a computer memory for use as a historical baseline reference of that disc drive's HGA modulation at the time of in situ testing. The FRF signature 220 can be stored in memory either internal or external to the disc drive.

Figure 13:
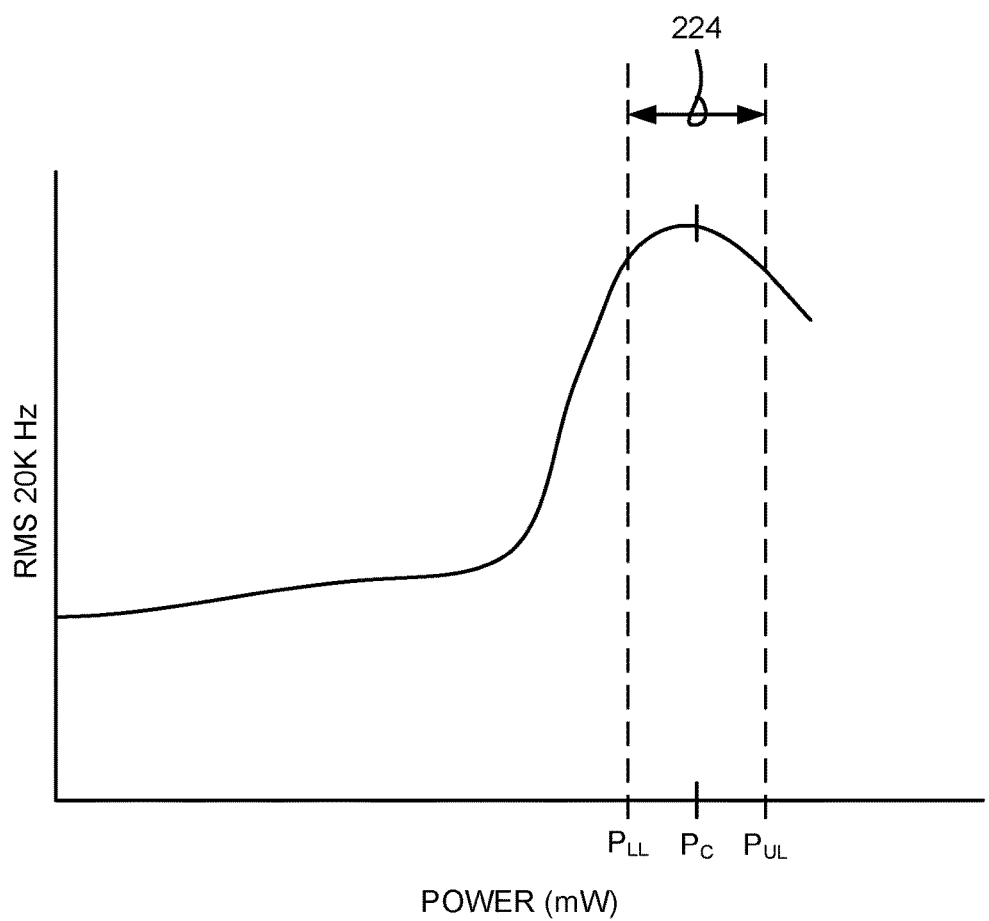
FIG. 13 graphically depicts the PZT response at a constant resonant frequency in relation to varying heater power to identify head/disc contact.

In block 158 the computation module 202 tests the disc drive for proper fly height to ensure no unexpected contact will occur between the read/write head and the storage media (head/disc contact). Preferably, the computation module 202 first ascertains a resonant frequency from the FRF signature 220, such as 222 at 20 k Hz depicted in FIG. 10. The computation module 202 then drives the PZTs 122, 124 substantially at that constant resonant frequency and varies the power to the heater 127 to deflect the read/write head toward the storage media. FIG. 13 graphically depicts the PZT 122, 124 response increases and then decreases around the power setting $P_c$ at which head/disc contact is made. Empirical testing and statistical regression can be employed to define a range 224 within which contact is expected at the selected resonant frequency. The range 224 is defined between a lower limit power ($P_{LL}$) and an upper limit power ($P_{UL}$). If $P_c$ is within the predetermined range then the disc drive is deemed acceptable for commercial use. In addition this information can be used to filter the servo inputs driving micro-actuation to avoid these resonances during normal drive operation.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
   a head gimbal assembly (HGA);
   a bridge circuit including first and second microactuators attached to the HGA; and
   a computation module connected to the bridge circuit and configured to independently measure an electrical output of each microactuator and to sum the electrical outputs to derive a value related to a bimodal modulation of the HGA.

2. The apparatus of claim 1 wherein the bridge circuit comprises two circuits connected in parallel to an excitation source and each circuit including one of the microactuators.

3. The apparatus of claim 2 wherein the excitation source comprises a variable-frequency voltage generator.

4. The apparatus of claim 1 wherein the computation module is configured to create a frequency response function (FRF) of the HGA bimodal modulation.

5. The apparatus of claim 4 wherein the computation module is configured to compare the FRF to a predetermined threshold in order to qualitatively characterize the HGA.

6. The apparatus of claim 4 wherein the computation module is configured to excite the microactuators at constant frequency while varying a power level supplied to a heater in the HGA to qualitatively characterize a fly height of the HGA.

7. The apparatus of claim 1 wherein in response to external excitation the microactuators both elongate in a vertically-dominant mode whereas one elongates and the other compresses in an offtrack-dominant mode.

8. An apparatus comprising:
   a pair of opposing-effect piezoelectric microactuators configured to selectively position the apparatus; and
   a variable-frequency excitation source configured to drive each of the microactuators.

9. The apparatus of claim 8 wherein the microactuators are oppositely poled.

10. The apparatus of claim 8 wherein the excitation source is configured to supply opposing-polarity driving voltages to the microactuators.

11. The apparatus of claim 8 comprising a computation module configured to independently measure outputs from the microactuators that indicate when the apparatus comes into contact with another object.

12. The apparatus of claim 11 wherein the microactuators are connected to a head gimbal assembly supporting a read/write head adjacent a data storage media.

13. A method comprising:
   obtaining a head gimbal assembly (HGA) having a pair of opposing-effect microactuators supporting a read/write head adjacent a data storage media, a variable frequency excitation source configured to drive each of the microactuators, and a computation module configured to individually read an electrical output of each microactuator; and exciting the microactuators to obtain a spectral frequency response function (FRF) of the HGA.

14. The method of claim 13 further comprising independently measuring the microactuator outputs.

15. The method of claim 14 further comprising comparing the FRF to a threshold value to qualitatively characterize the HGA.

16. The method of claim 15 wherein the threshold value is a baseline FRF.

17. The method of claim 15 further comprising exciting the microactuators at a constant frequency while deflecting the read/write head toward the data storage media to qualitatively characterize a fly height of the read/write head.

18. The method of claim 17 wherein the deflecting the read/write head toward the data storage media comprises varying a power level supplied to a heater in the read/write head.

19. The method of claim 18 comprising comparing a power level that causes the read/write head to contact the data storage media to a threshold power level.

\* \* \* \* \*